United States Patent
Inoue et al.

(10) Patent No.: US 8,174,220 B2
(45) Date of Patent: May 8, 2012

(54) APPARATUS FOR CONTROLLING PERMANENT-MAGNET ROTARY ELECTRIC MACHINE

(75) Inventors: Hideki Inoue, Saitama (JP); Kota Kasaoka, Saitama (JP); Hisayoshi Takahashi, Saitama (JP)

(73) Assignee: Honda Motor Co., Ltd, Tokyo (JP)

( * ) Notice: Subject to any disclaimer, the term of this patent is extended or adjusted under 35 U.S.C. 154(b) by 286 days.

(21) Appl. No.: 12/642,214

(22) Filed: Dec. 18, 2009

(65) Prior Publication Data
US 2010/0156330 A1    Jun. 24, 2010

(30) Foreign Application Priority Data
Dec. 19, 2008 (JP) ................. P2008-323757

(51) Int. Cl.
*H02P 21/00* (2006.01)
(52) U.S. Cl. ......... 318/400.02; 318/400.01; 318/400.38; 318/437
(58) Field of Classification Search ............. 318/400.01, 318/400.02, 400.38, 400.39, 437
See application file for complete search history.

(56) References Cited

U.S. PATENT DOCUMENTS

| | | | |
|---|---|---|---|
| 5,796,228 A | 8/1998 | Kojima et al. | |
| 6,922,028 B2* | 7/2005 | Akizuki | 318/400.04 |
| 7,388,346 B2* | 6/2008 | Nishimura et al. | 318/723 |
| 7,564,206 B2* | 7/2009 | Oomura | 318/400.26 |
| 7,733,044 B2* | 6/2010 | Nakamura et al. | 318/400.02 |
| 7,872,438 B2* | 1/2011 | Morimoto et al. | 318/700 |
| 2006/0012328 A1 | 1/2006 | Yasukawa et al. | |

FOREIGN PATENT DOCUMENTS

| | | |
|---|---|---|
| JP | 10-080188 A | 3/1998 |
| JP | 11-275900 A | 10/1999 |
| JP | 2001-008486 A | 1/2001 |
| JP | 2001-204190 A | 7/2001 |
| JP | 2001-211698 A | 8/2001 |
| JP | 2004-266935 A | 9/2004 |
| JP | 3688673 B2 | 6/2005 |
| JP | 2005-218257 A | 8/2005 |
| JP | 2006-033993 A | 2/2006 |

* cited by examiner

*Primary Examiner* — Bentsu Ro
*Assistant Examiner* — Thai Dinh
(74) *Attorney, Agent, or Firm* — Arent Fox LLP

(57) ABSTRACT

Apparatus controlling a permanent magnet rotary electric machine. After the apparatus controls a current control portion, when a rotor of the machine rotates at a constant speed, to supply a predetermined current to an armature, the apparatus performs a dq vector control process by determining a predetermined temporarily set value as a magnetic pole position correction quantity while a d-axis current command value and a q-axis current command value in the dq vector control process performed on a dq coordinate system that has a d-axis extending in the direction of a magnetic field of the permanent magnet of the rotor and a q-axis extending in a direction perpendicular to the d-axis. Then, the apparatus obtains the magnetic pole position correction quantity based on a predetermined operation expression using the d-axis voltage command value and the q-axis voltage command value from the dq vector control process.

6 Claims, 10 Drawing Sheets

US 8,174,220 B2

APPARATUS FOR CONTROLLING PERMANENT-MAGNET ROTARY ELECTRIC MACHINE

CROSS-REFERENCE TO RELATED APPLICATION

This application is based on and claims priority under 35 U.S.C. §119 from Japanese Patent Application No. 2008-323757 filed on Dec. 19, 2008.

BACKGROUND OF THE INVENTION

1. Technical Field

The present invention relates to an apparatus for controlling a permanent-magnet rotary electric machine.

2. Related Art

Permanent-magnet rotary electric machines (e.g., a three-phase direct-current (DC) brushless motor) each having a permanent magnet and an armature in a rotor and a stator, respectively, need to manipulate the phase of a voltage to be applied to the armature (more specifically, a voltage to be applied to the winding of each phase of the armature (hereinafter referred to as an "armature-applied voltage")) according to the positions (more specifically, the rotation angular positions) of the magnetic poles of the rotor to control the generated torque and the rotational speed thereof. Thus, the permanent-magnet rotary electric machine of such a type has a magnetic pole position detector for detecting the positions of the magnetic poles of the rotor, and manipulates the phase of the armature-applied voltage according to the detected positions of the magnetic poles. The magnetic pole position detector includes a Hall element, an encoder, a resolver, or the like.

In a case where a permanent-magnet rotary electric machine with the above magnetic pole position detector is controlled, an error often occurs between the positions of the magnetic poles detected by the magnetic pole position detector and the actual positions thereof due to the accuracy of positioning of the magnetic pole position detector at the attachment thereof to the machine and that of manufacturing thereof. If such an error occurs, the rotary electric machine has its power factor and efficiency lowered by manipulating the phases of the armature voltages using the detected positions of the magnetic poles as they are.

There has been known a technique of correcting the detected positions of magnetic poles as described in, e.g., JP-A-2001-8486 (Paragraph Nos. 0008, 0018 to 0021). The technique described in JP-A-2001-8486 (Paragraph Nos. 0008, 0018 to 0021) has been developed by focusing attention on the fact that, in a rotary electric machine (cylindrical machine) having a rotor whose magnet is cylindrically shaped, when armature voltages are manipulated to minimize armature currents (phase currents) in a case where a torque T generated by the rotary electric machine is proportional to a q-axis current Iq, and where a load torque is constant, the ratio between a d-axis current command value and the armature current or the ratio between the d-axis current command value and a q-axis current command value has a certain correlation with an error angle between the position of each of the magnetic poles, which is detected by the magnetic pole position detector, and the associated actual position thereof. According to the technique described in JP-A-2001-8486 (Paragraph Nos. 0008, 0018 to 0021), the error angle is calculated based on the value of the above ratio. The detected positions of the magnetic poles are corrected based on the calculated error angle to thereby control the rotary electric machine.

However, according to the technique described in JP-A-2001-8486 (Paragraph Nos. 0008, 0018 to 0021), it is assumed that the torque T generated by the rotary electric machine is proportional to the q-axis current Iq. Thus, the technique described in JP-A-2001-8486 (Paragraph Nos. 0008, 0018 to 0021) cannot be applied to a rotary electric machine (salient-pole machine) having a rotor whose magnets are of the salient pole type. That is, as described in JP-A-2001-8486 (Paragraph Nos. 0008, 0018 to 0021), the torque T generated by a permanent-magnet rotary electric machine is expressed by the following equation (A):

$$T = \Phi \cdot Iq + (Ld - Lq) \cdot Id \cdot Iq \qquad (A)$$

Where $\Phi$ designates a magnetic flux, Ld, and Lq represent a d-axis inductance and a q-axis inductance, respectively, and Id and Iq denote a d-axis current and a q-axis current, respectively.

In this case, Ld=Lq in a cylindrical machine whose magnet is cylindrically-shaped. Thus, the torque T is proportional to the q-axis current Iq. However, Ld≠Lq in a salient-pole machine whose magnet is of the salient pole type. Thus, the torque T is not proportional to the q-axis current Iq. Consequently, the above prerequisite to the technique described in JP-A-2001-8486 (Paragraph Nos. 0008, 0018 to 0021) is not satisfied by the salient pole machines. Accordingly, the detected positions of the magnetic poles cannot appropriately be corrected.

A technique described in Japanese Patent No. 3,688,673 solves the above problems. FIG. 8 is a block diagram illustrating the internal configuration of a control apparatus for a permanent magnet rotary electric machine whose rotor is connected to an output shaft of an engine, disclosed in Japanese Patent No. 3,688,673. FIG. 9 is a graph illustrating change in each of the number of rotations of the engine, a d-axis current, a q-axis current and a voltage phase, which are measured when the control apparatus illustrated in FIG. 8 obtains a magnetic pole position correction quantity. The voltage phase is equal to an arctangent $\tan^{-1}$ (Vdc/Vqc) of a ratio (Vdc/Vqc) of a d-axis voltage command value Vdc to a q-axis voltage command value Vqc.

In a state in which a rotor 4 of a permanent magnet rotary electric machine 1 is rotated by an engine 3 at a constant number of rotations as illustrated in FIG. 9, and in which an armature current is substantially zero, the control apparatus illustrated in FIG. 8 performs a dq vector control process of handling the rotary electric machine 1 on a dq coordinate system that has a d-axis extending in the direction of a magnetic field of the permanent magnet 5 of the rotor 4 and a q-axis extending in a direction perpendicular to the d-axis. Thus, the control apparatus obtains a magnetic pole position correction quantity for correcting the position of magnetic poles detected by a magnetic pole position detector 8, such that a d-axis voltage command value obtained by performing the dq vector control process is substantially zero. The control apparatus manipulates the phase of an armature voltage using the magnetic pole positions obtained by correcting the detected magnetic pole positions using the magnetic pole position correction quantity.

Hereinafter, the derivation of the magnetic pole position correction quantity based on the technique described in Japanese Patent No. 3,688,673 is described. Referring to FIG. 10A, d-q coordinates represent dq coordinates (hereinafter referred to as actual coordinates d-q) in the case of setting the direction of the actual magnetic field of the rotor 4 along the d-axis. Referring next to FIG. 10B, dc-qc coordinates represent dq coordinates (dq coordinates (hereinafter referred to as "command-axis coordinates dc-qc") used in the aforementioned dq vector control process) determined by the positions (hereinafter referred to as "detected magnetic pole positions") of magnetic poles, which are detected by a magnetic pole position detector.

Attention is now focused on a state (hereinafter referred to as a "zero-current state") in which the rotor 4 of the permanent-magnet rotary electric machine 1 rotates and in which an armature current I (electric current flowing through each phase of the armature) thereof is "0". In the zero-current state, a voltage V applied to the armature (i.e., a voltage applied to each phase of the armature) is equal to a counter-electromotive voltage E generated by the magnetic field of the rotor 4. In this case, it is assumed that no error occurs between the detected magnetic pole positions and true magnetic pole positions. That is, as illustrated in FIG. 10A, each of actual coordinates d-q coincides with an associated one of command-axis coordinates dc-qc. At that time, a d-axis voltage command value (voltage command value on the command axis dc) Vdc determined by performing the dq vector control process is Vdc=0, and a q-axis voltage command value (voltage command value on the command axis qc) Vqc determined by the dq vector control process is Vqc=E.

Therefore, in a state in which the d-axis voltage command value Vdc determined by the dq vector control process in the zero-current state is "0", the magnetic pole positions can correctly be detected. This means that it is sufficient for correctly grasping the magnetic pole positions to correct the detected magnetic pole positions so that the d-axis voltage command value Vdc is "0" in the zero-current state.

It is now assumed that an error occurs between the detected magnetic pole positions and true magnetic pole positions. For example, as illustrated in FIG. 10B, the command-axis coordinates dc-qc have an error of an angle θofs (hereinafter, the angle θofs is referred to as a "magnetic pole position error angle θofs") with respect to the associated actual coordinates d-q. At that time, the d-axis voltage command value Vdc (voltage command value on the command axis dc) determined by performing the dq vector control process is such that Vdc≠0. The q-axis voltage command value Vqc (voltage command value on the command axis qc) is such that Vqc≠E. The square root of the sum (Vdc$^2$+Vqc$^2$) of Vdc$^2$ and Vqc$^2$ is equal to the magnitude of the counter-electromotive voltage E. The ratio (Vdc/Vqc) of the d-axis voltage command value Vdc to the q-axis voltage command value Vqc is equal to the tangent tan θofs of the magnetic pole position error angle θofs. That is, the following equation (1) holds.

$$\theta ofs = \tan^{-1}(Vdc/Vqc) \quad (1)$$

The magnitude of the counter-electromotive voltage E (thus, the magnitude of each of the d-axis voltage command value Vdc and the q-axis voltage command value Vqc) depends upon the rotational speed of the rotor. The equation (1) holds regardless of the rotational speed of the rotor 4 if the permanent-magnet rotary electric machine is in the zero-current state. The equation (1) is equivalent to the following equation (2) or (3):

$$\theta ofs = \sin^{-1}\{Vdc/(\sqrt{Vdc^2+Vqc^2})\} \quad (2)$$

$$\theta ofs = \cos^{-1}\{Vqc/(\sqrt{Vdc^2+Vqc^2})\} \quad (3)$$

Consequently, the magnetic pole position error angle θofs can be determined according to the equation (1) or (2) or (3) from the d-axis voltage command value Vdc and the q-axis voltage command value Vqc that are determined by the dq vector control process in the zero-current state. The correct magnetic pole positions can be grasped by correcting the detected magnetic pole positions by the magnetic pole position error angle θofs thus determined. For example, if the rotational angular position of a magnetic pole corresponding to a detected magnetic pole position is represented by θact, an angle (θact−θofs) obtained by subtracting a magnetic pole position error angle θofs from the angular position θact represents a correct magnetic pole position (true magnetic pole position).

The above principles hold, regardless of whether the magnet of the rotor 4 is of the cylindrical type or the salient-pole type.

According to the technique described in Japanese Patent No. 3,688,673, the magnetic pole position correction quantity θofs is obtained on the basis of a predetermined operation expression (equation (1) or (2) or (3)) from the d-axis voltage command values Vdc and the q-axis voltage command value Vqc obtained by performing the dq vector control process in the zero-current state. Thus, a magnetic pole position that obtained by correcting the detected magnetic pole position using the magnetic pole position correction quantity θofs coincides with an actual magnetic pole position of the rotor 4 regardless of whether the permanent-magnet rotary machine is a cylindrical machine or a salient-pole machine. Accordingly, an operation (torque or speed thereof) of the rotary electric machine 1 can be controlled, without impairing the efficiency and power factor of the rotary electric machine 1, by manipulating the phase of the armature voltage according to the corrected magnetic pole position.

According to the technique described in Japanese Patent No. 3,688,673, even when a command is issued to bring the machine into a state (zero-current state) in which the armature current (i.e., the d-axis current Id and the q-axis current Iq) is substantially zero, as illustrated in FIG. 9, it takes a certain time until a pulse-width modulation (PWM) inverter circuit 17 provided in the control apparatus illustrated in FIG. 8 stably outputs a voltage corresponding to the command. That is, due to the influence of the response of a switching element of the PWM inverter circuit 17, there is a dead time after the issuance of the command until the output of the PWM inverter circuit 17 is stabilized. Accordingly, as illustrated in FIG. 9, the voltage phase is gradually converged. That is, the response speed of the voltage phase at obtaining the magnetic pole position correction quantity θofs is low. However, it is desirable that the response speed is high.

When the response of the voltage command generator is improved, the response time of the voltage phase is reduced. However, the PWM inverter circuit responds to the variation error of the current command. In this case, the stability of an output voltage is reduced. The stability of the voltage phase responding to the current command is degraded.

SUMMARY OF THE INVENTION

An object of the invention is to provide an apparatus for controlling a permanent magnet rotary electric machine, which can implement a high response speed without degrading the accuracy of a voltage phase when a magnetic pole position correction quantity is obtained.

To achieve the foregoing object by solving the above problems, according to a first aspect of the invention, there is provided an apparatus (hereinafter referred to as a first apparatus) for controlling a permanent magnet rotary electric machine (e.g., a motor 1 according to an embodiment) including:

a magnetic pole position detection portion (e.g., a magnetic pole position detection portion 8 according to an embodiment) configured to detect positions of magnetic poles of a rotor (e.g., a rotor 4 according to the embodiment) of the permanent magnet rotary electric machine having a permanent magnet (e.g., a permanent magnet 5 in the embodiment) and an armature (e.g., an armature 7 according to the embodiment) in the rotor and a stator (e.g., a stator 6 according to the embodiment), respectively, a correction quantity determination portion (e.g., a phase corrector 101 according to the embodiment) configured to obtain a magnet pole position correction quantity for correcting positions of magnet poles to be detected by the magnetic pole position detection portion, and a current control portion (e.g., a current command generator 9, a current command switcher 10, a voltage command generator 15, a voltage coordinate converter 16, and a PWM inverter circuit 17) configured to control an armature current flowing through the armature while manipulating a phase of the armature voltage to be applied to the armature according to the magnetic pole positions obtained by correcting the magnetic pole positions detected by the magnetic pole position detection portion using the magnetic pole position correction quantity obtained by the correction quantity determination portion, wherein after the current control portion is controlled in a state that the rotor rotates at a constant speed, to supply a predetermined current to the armature, a dq vector control process is performed by determining a predetermined temporarily set value as the magnetic pole position correction quantity while a d-axis current command value and a q-axis current command value in the dq vector control process performed on a dq coordinate system that has a d-axis extending in a magnetic field direction of the permanent magnet of the rotor and a q-axis extending in a direction perpendicular to the d-axis, and the magnetic pole position correction quantity is obtained based on a predetermined operation expression using the d-axis voltage command value and the q-axis voltage command value as variable numbers which are obtained when the dq vector control process is performed.

According to a second aspect of the invention, there is provided the apparatus (hereinafter referred to as a second apparatus) for controlling a permanent magnet rotary electric machine according to the first aspect, wherein the predetermined current is an alternating current whose direction is reversed between positive and negative directions.

According to a third aspect of the invention, there is provided the apparatus (hereinafter referred to as a third apparatus) for controlling a permanent magnet rotary electric machine according to the second aspect, wherein the predetermined current is an alternating current of which a value of the time integral is substantially zero.

According to a fourth aspect of the invention, there is provided the apparatus (hereinafter referred to as a fourth apparatus) for controlling a permanent magnet rotary electric machine according to any one of the first to third aspects, wherein the correction quantity determination portion controls the current control portion to supply the predetermined current to the armature until a variation in the value of the arctangent of a ratio of the d-axis voltage command value to the q-axis voltage command value is within a predetermined value.

According to a fifth aspect of the invention, there is provided the apparatus (hereinafter referred to as a fifth apparatus) for controlling a permanent magnet rotary electric machine according to the first or fourth aspect, wherein before the correction quantity determination portion supplies the predetermined current to the armature, each of the positions of the magnetic poles of the rotor is set at a maximum error position in one of the positive and negative directions, and the predetermined current is a rectangular wave having a constant amplitude.

According to a sixth aspect of the invention, there is provided the apparatus (hereinafter referred to as a sixth apparatus) for controlling a permanent magnet rotary electric machine according to any one of the first to fifth aspects, wherein while obtaining the magnetic pole position correction quantity, the correction quantity determination portion increases a response gain upon obtaining the d-axis voltage command value and the q-axis voltage command value during performance of the dq vector control process.

According to the first to fourth apparatuses for controlling a permanent magnet rotary electric machine, when the magnetic pole position correction quantity is obtained, the predetermined current is supplied to the armature before both the d-axis current command value and the q-axis current command value are held at zero. At that time, even in a case where the response speed of the current control portion is about the same as that of a conventional one, the voltage phase is quickly stabilized. Thus, the dead time at obtaining of the magnetic pole position correction quantity can be shortened. Consequently, the magnetic pole position correction quantity can be obtained in a short time.

According to the fifth apparatus for controlling a permanent magnet rotary electric machine, a correction angle can be obtained at high speed without supplying the alternating current.

According to the sixth apparatus for controlling a permanent magnet rotary electric machine, when a current response speed is increased by increasing the response gain, the response time of the voltage phase is shortened. Accordingly, when the magnetic pole position correction quantity is obtained, a high response speed can be implemented.

3,688,673 for a permanent magnet rotary electric machine whose rotor is connected to an output shaft of an engine.

Figure 8:
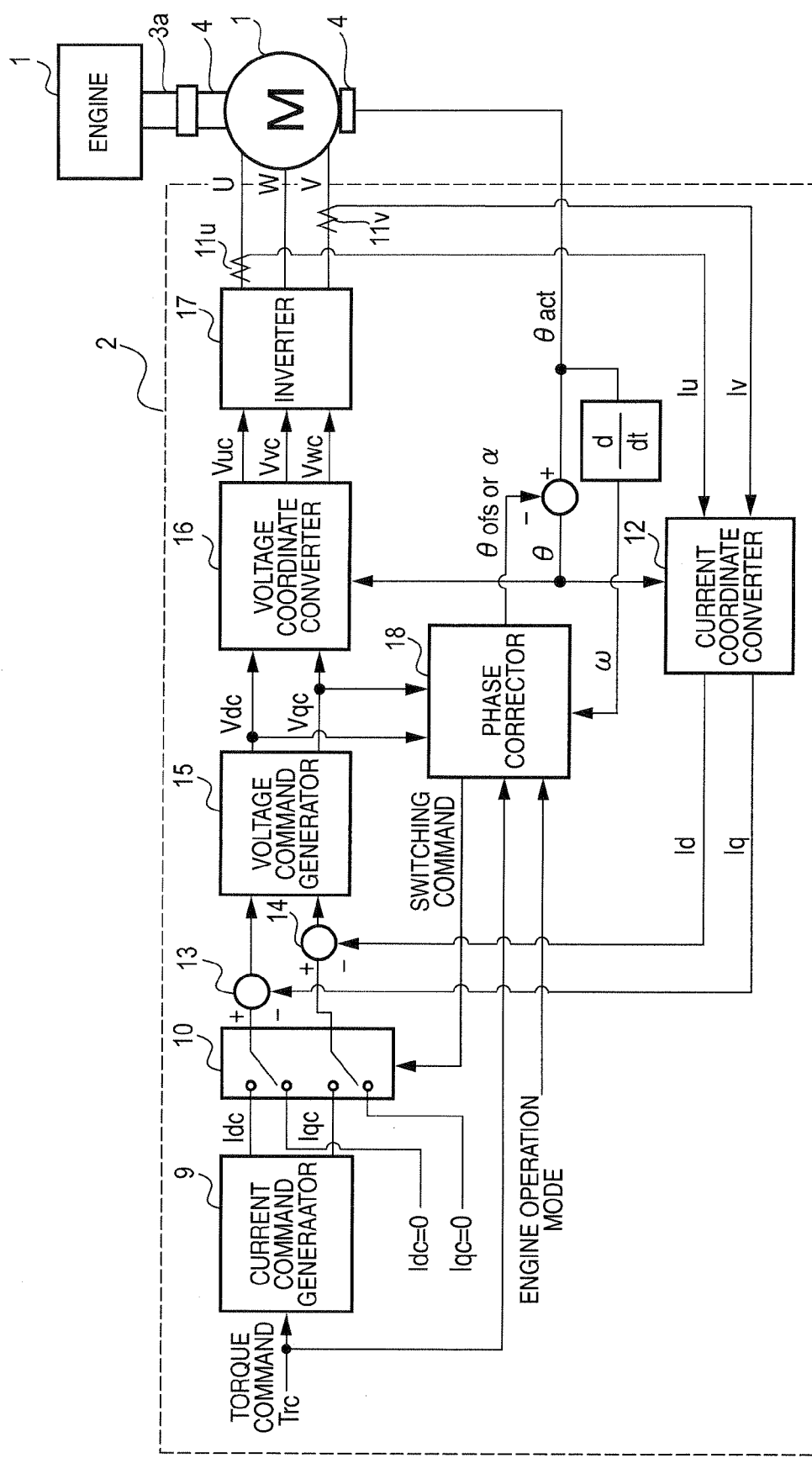
FIG. 8 is a block diagram illustrating the internal configuration of a control apparatus disclosed in Japanese Patent No.
Figure 9:
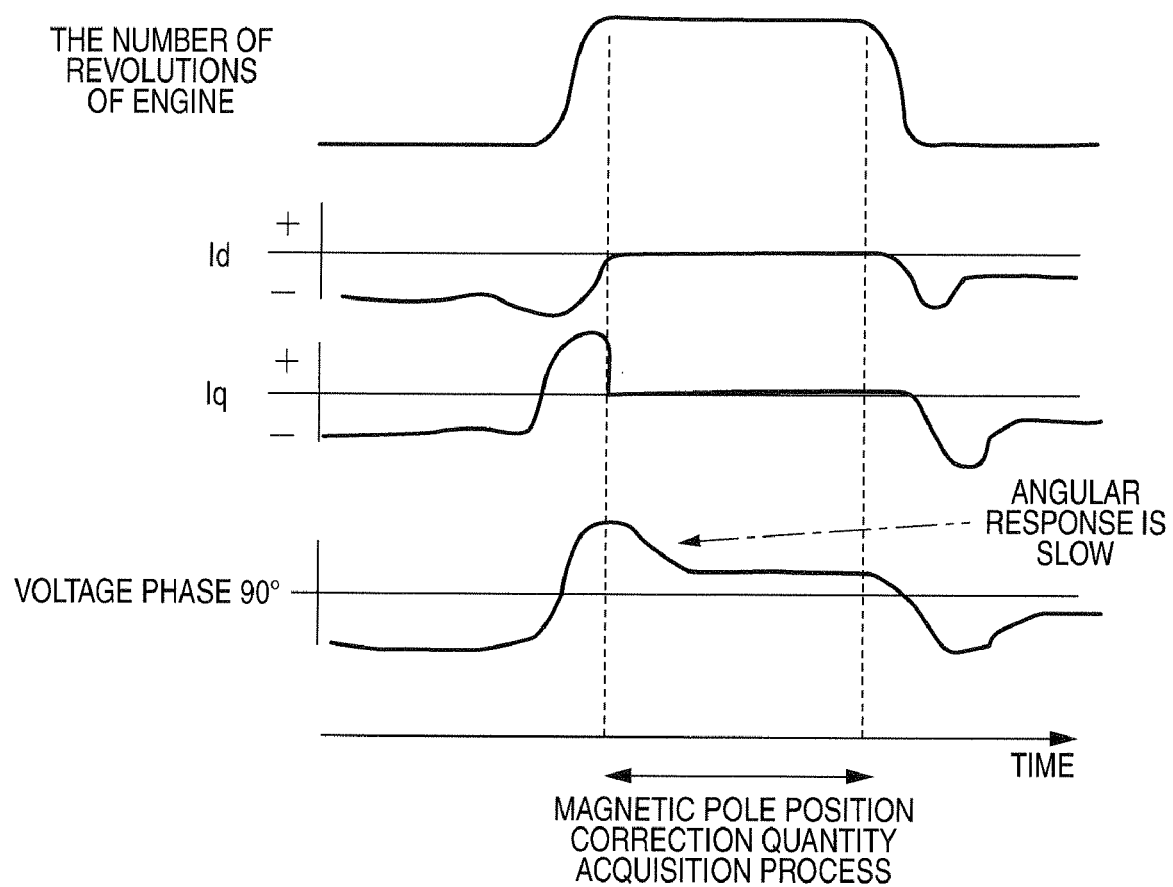

FIG. 9 is a graph illustrating change in each of the number of rotations of the engine, a d-axis current, a q-axis current and a voltage phase, which are measured when the control apparatus illustrated in FIG. 8 obtains a magnetic pole position correction quantity.

Figure 10B:
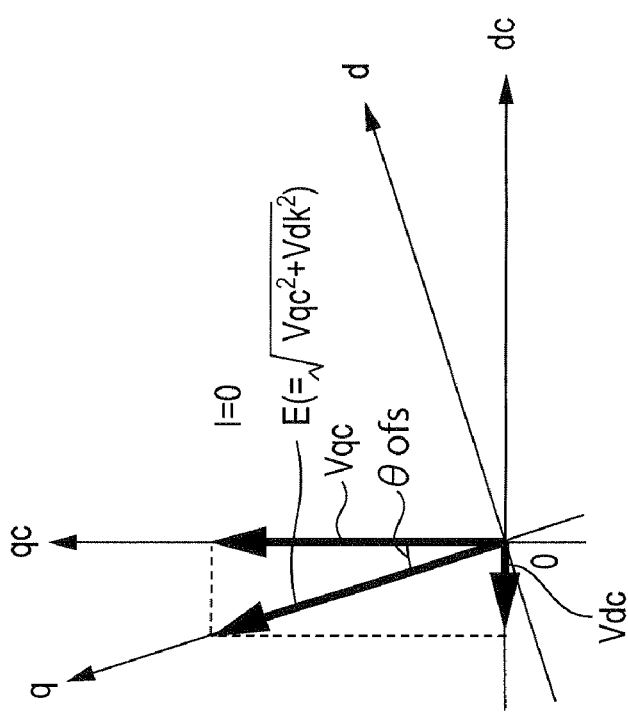
Figure 10A:
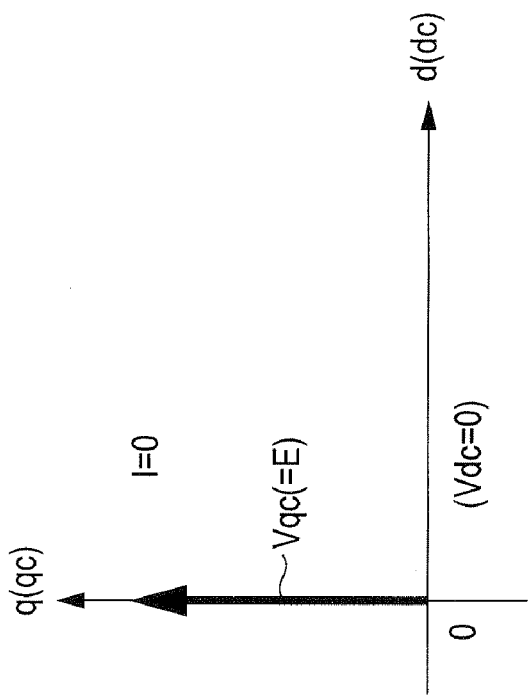

FIGS. 10A and 10B are diagrams illustrating the principle of the invention.

DETAILED DESCRIPTION OF THE PREFERRED EMBODIMENTS

Hereinafter, embodiments of the invention are described with reference to the accompanying drawings.

First Embodiment

Figure 1:
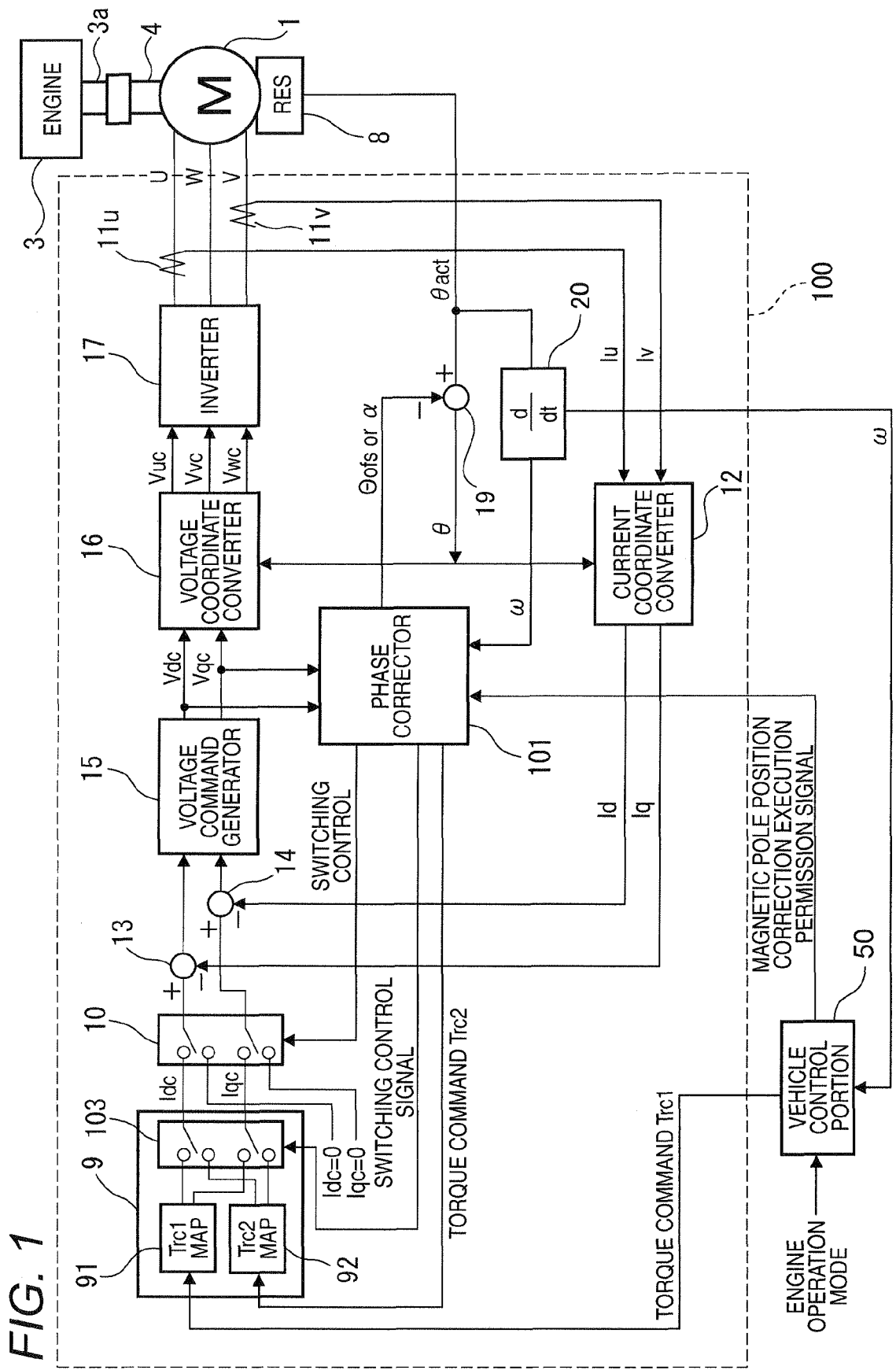
FIG. 1 is a block diagram illustrating the configuration of each of an apparatus according to an embodiment of the invention and an apparatus according to a reference example.

A first embodiment of the invention is described with reference to FIGS. 1 to 5 and 10. FIG. 1 is a block diagram illustrating the configuration of an apparatus according to the present embodiment of the invention. In FIG. 1, each of components common to the apparatuses illustrated in FIGS. 1 and 8 is designated with the same reference numeral. A motor controller 100 for controlling electric current flowing through a permanent magnet rotary electric machine 1 (hereinafter referred to as a motor 1) is provided as an apparatus for controlling a permanent magnet rotary electric machine according to the present embodiment.

In the present embodiment, the motor 1 is mounted on a parallel type hybrid vehicle as a motor for generating an auxiliary output (auxiliary vehicle propelling force) which assists an output (vehicle propelling force) of an engine 3, if necessary. A rotator (rotor) 4 of the motor 1 is connected to an output shaft 3a of the engine 3 to be able to rotate interlockingly with the output shaft 3a thereof. In addition, an output (torque) generated at the rotor 4 is transmitted to drive wheels of the vehicle via a power transmission apparatus (not shown), such as a transmission, together with an output of the engine 3.

Figure 2:
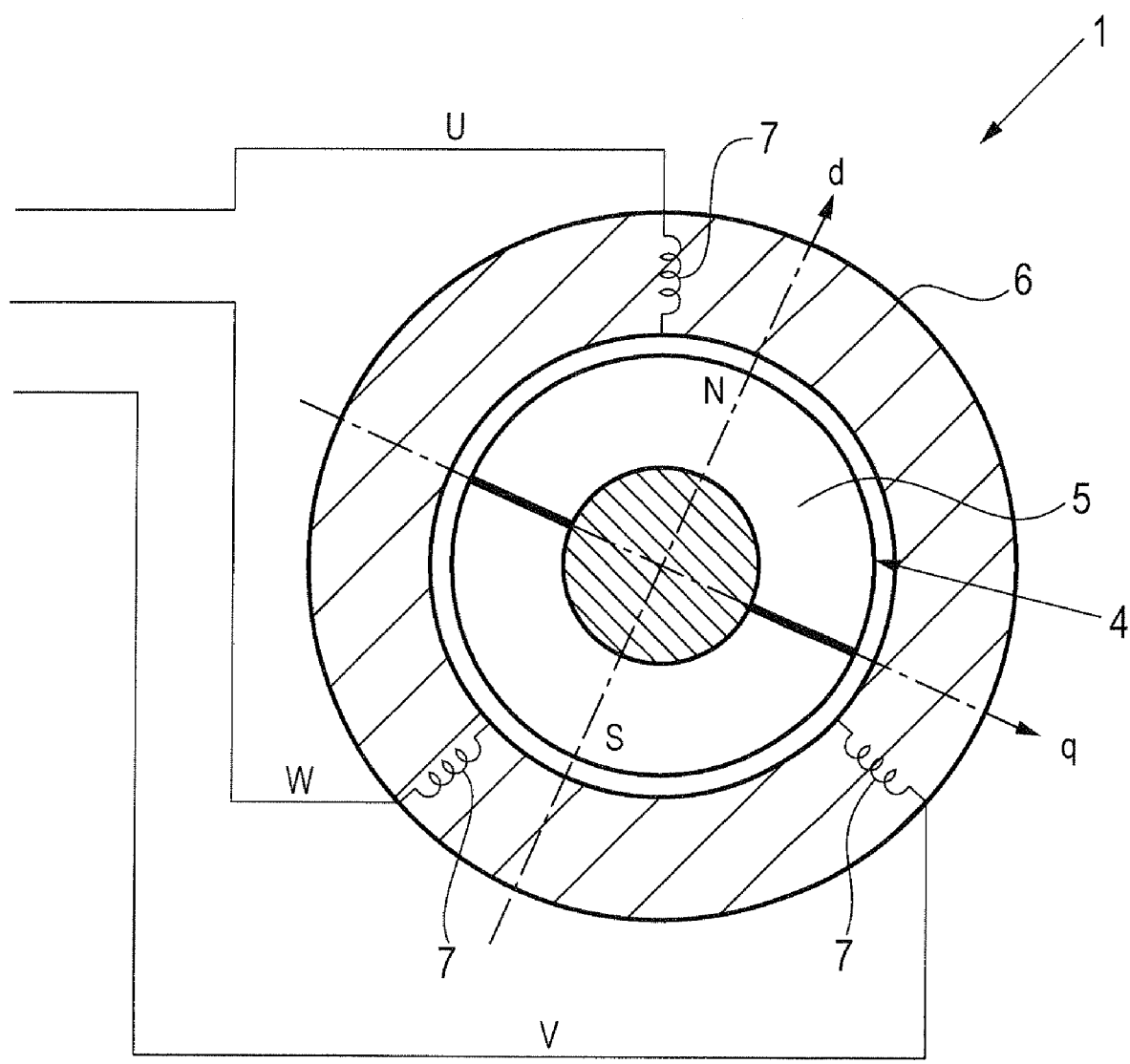
FIG. 2 is a transversally cross-sectional diagram schematically illustrating a permanent magnet rotary electric machine that is the apparatus illustrated in FIG. 1.

According to the present embodiment, the motor 1 is a three-phase direct-current (DC) brushless motor. FIG. 2 is a transversally cross-sectional view schematically illustrating the configuration of a primary part of the motor 1. As illustrated in FIG. 2, a permanent magnet 5 is provided in the rotator (rotor) 4 of the motor 1. An armature 7 including wirings respectively corresponding to three phase (i.e., a U-phase, a V-phase, and a W-phase) is provided in a stationary part (stator) 6. In the present embodiment, the permanent magnet 5 is of the cylindrical type. Instead, the permanent magnet 5 of the salient pole type can be used. FIG. 2 also illustrates a dq coordinate system that has a d-axis extending in the direction of a magnetic field of the permanent magnet 5 of the rotor 4 and a q-axis extending in a direction perpendicular to the d-axis.

Referring back to FIG. 1, a magnetic pole position detector 8 for detecting the positions of the magnetic poles of the rotor 4 is attached to the motor 1. The magnetic pole position detector 8 includes a Hall element, an encoder, a resolver, or the like. The magnetic pole position detector 8 outputs a signal, which represents a detected value of a rotation angle θact of each magnetic pole (rotation angle of the q-axis) from a predetermined reference rotational position of the rotor 4, as a magnetic pole position detection signal. Generally, an error of the detected value of the rotation angle θact (hereinafter referred to as a magnetic pole detection angle θact), which is obtained by the magnetic pole position detector 8, with respect to an actual magnetic pole position (actual rotation angle of the magnetic pole) of the rotor 4 is generated due to an attachment error of the magnetic pole position detector 8, or the like.

The motor controller 100 controls an operation of the motor 1 by performing the aforementioned dq vector control process. The motor controller 100 has a current command generator 9 for determining a d-axis current command value Idc and a q-axis current command value Iqc according to a torque command value Trc which is a command value for a torque to be generated by the motor 1, and a current command switcher 10 for selectively outputting a set (Idc, Iqc) of the d-axis current command value Idc and the q-axis current command value Iqc that are output from the current command generator 9 and a set (0, 0) of the d-axis current command value Idc and the q-axis current command value Iqc, each of which is 0. The current command generator 9 obtains a d-axis current and a q-axis current which are required to cause the motor 1 to generate torque according to the supplied torque command value Trc, and which outputs the d-axis current and the q-axis current as the d-axis current command value Idc and the q-axis current command value Iqc, respectively. The current command switcher 10 switches this output according to a command issued from a phase corrector 101 which is described below.

The motor controller 100 also has armature current detectors 11u and 11v which detect armature currents Iu, Iv flowing through the U-phase and the V-phase of the armature 7 of the motor 1, respectively, and a current coordinate converter 12 for performing coordinate conversion on the detected values of the armature currents Iu and Iv to calculate a d-axis current Id and a q-axis current Iq in command-axis coordinates dc-dq. The armature 7 has three phases. Thus, a current flowing through a given one of the three phases is uniquely determined using currents flowing through the other two phases. For example, the current flowing through W-phase is obtained as −(Iu+Iv). Thus, according to the present embodiment, the armature current detectors 11u and 11v detect currents in two phases (the U-phase and the V-phase in the present embodiment) of the armature 7. The current coordinate converter 12 performs the coordinate conversion on the detected values of the armature currents Iu and Iv according to the following equation (4) using a magnetic pole rotation angle θ obtained by a subtractor 19 (to be described below) as representing the rotation angle of each magnetic pole of the rotor 4.

[Equation 1]

$$\begin{bmatrix} Idc \\ Iqc \end{bmatrix} = \sqrt{2} \begin{bmatrix} \sin(\theta + \frac{\pi}{3}) & \sin\theta \\ \cos(\theta + \frac{\pi}{3}) & \cos\theta \end{bmatrix} \begin{bmatrix} Iu \\ Iv \end{bmatrix} \quad (4)$$

The currents Id and Iq obtained by the above coordinate conversion serve as a detected value of the d-axis current and that of the q-axis current, respectively, in the command-axis coordinates dc-qc (dq coordinates determined using θ as representing the angular position of the d-axis) determined by the magnetic pole rotation angle θ. In the following description, the currents Id and Iq are referred to as a detected d-axis current Id and a detected q-axis current Iq, respectively.

The motor controller 100 further includes subtractors 13 and 14 which obtain the deviation between the d-axis current command value Idc output from the current command switcher 10 and the detected d-axis current Id determined by the current coordinate converter 12, respectively, and the deviation between the q-axis current command value Iqc output from the current command switcher 10 and the detected q-axis current Iq determined by the current coordinate converter 12, a voltage command generator 15 for determining a d-axis command value Vdc and q-axis voltage command value Vqc which are command values of voltages to be applied in the directions of the axes in the command-axis coordinates dc-qc according to the deviations (Idc−Id) and (Iqc−Iq), a voltage coordinate converter 16 for performing coordinate conversion on the d-axis voltage command value Vdc and the q-axis voltage command value Vqc to calculate command values Vuc, Vvc, and Vwc (hereinafter referred to as "phase voltage command values Vuc, Vvc, and Vwc") of voltages to be applied to the phases of the armature 7, respectively, and a PWM inverter circuit 17 for controlling actual voltages to be applied to the phases of the armature 7, respectively, according to the phase voltage command values Vuc, Vvc, and Vwc.

Basically, the voltage command generator 15 operates to determine a d-axis command value Vdc and a q-axis voltage command value Vqc according to a feedback control law, such as a proportional-integral (PI) control law, to set the deviations (Idc−Id) and (Iqc−Iq) at "0". The voltage command generator 15 of such a type is known. Thus, the detail description thereof is omitted. However, the voltage command generator 15 obtains a d-axis voltage command value Vdc and a q-axis voltage command value Vqc according to the feedback control law. In addition, a non-interference control process for compensating for an interference of speed electromotive forces between the d-axis and the q-axis.

The voltage coordinate converter 16 performs coordinate conversion on the d-axis command value Vdc and the q-axis voltage command value Vqc using the same magnetic pole rotation angle θ as that used in the coordinate conversion performed by the current coordinate converter 12 according to the following equation (5).

[Equation 2]

$$\begin{bmatrix} Vu \\ Vv \\ Vw \end{bmatrix} = \sqrt{\frac{2}{3}} \begin{bmatrix} \cos\theta & -\sin\theta \\ \cos\left(\theta - \frac{2}{3}\pi\right) & -\sin\left(\theta - \frac{2}{3}\pi\right) \\ \cos\left(\theta + \frac{2}{3}\pi\right) & -\sin\left(\theta + \frac{2}{3}\pi\right) \end{bmatrix} \begin{bmatrix} Vdc \\ Vqc \end{bmatrix} \quad (5)$$

The phase voltage command values Vuc, Vvc, and Vwc determined by the above coordinate conversion serve to define the magnitudes and the phases of the voltages to be applied to the U-phase, the V-phase, and the W-phase of the armature 7. The PWM inverter circuit 17 controls the magnitudes (amplitudes) and the phases of the voltages to be applied to the U-phase, the V-phase, and the W-phase of the armature 7 according to the phase voltage command values Vuc, Vvc, and Vwc.

The motor controller 100 also has a phase corrector 101 for determining and outputting a magnetic pole position error angle θofs which represents an error angle of the detected rotation angle θact obtained by the magnetic pole position detector 8 from the actual rotation angle of the magnetic poles, as a magnetic pole position correction quantity according to the present invention, a subtractor 19 for subtracting the magnetic pole position error angle θofs (hereinafter referred to as "magnetic pole correction angle θofs"), which is output from the phase corrector 101, from the detected magnetic pole angle θact obtained by the magnetic pole position detector 8 thereby to obtain a magnetic pole rotation angle θ (=θact−θofs) used in the coordinate conversion performed by the current coordinate converter 12 and the voltage coordinate converter 16, and a speed calculator 20 for differentiating the detected magnetic pole angle θact to obtain a rotation speed (more specifically, a rotational angular velocity) ω=dθact/dt of the rotor 4 of the motor 1. The rotational speed ω can be detected by an appropriate speed sensor. Alternatively, the rotational speed Ne of the engine 3 detected by a rotational speed sensor (not shown) of the engine 3 can be used, instead of the rotational speed ω.

The phase corrector 101 corresponds to a correction quantity determining means according to the invention. The details of the processing performed by the phase corrector 101 are described below. The phase corrector 101 obtains and stores a magnetic pole correction angle θofs under predetermined conditions, and outputs the stored magnetic pole correction angle θofs when the motor 1 operates under ordinary conditions other than the predetermined conditions. The phase corrector 101 is configured to output a temporary set value α for the magnetic pole correction angle θofs (hereinafter referred to as a "temporary set correction angle α") while performing a process of obtaining the magnetic pole correction angle θofs. At that time, the magnetic pole rotational angle θ obtained by the subtractor 19 is given by the following equation: θ=θact−α.

A vehicle control portion 50 outputs a torque command Trc1 based on data representing an operation mode of the engine 3 (e.g., flag data indicating whether the operation mode of the engine 3 is a start-up mode thereof) in response to a starter switch (not shown) of the vehicle. The vehicle control portion 50 is provided outside the motor controller 100. In a case where the torque command Trc1 represents a value of substantially zero, and where the rotational speed ω of the motor 1 is substantially constant and equal to or less than a predetermined value, the vehicle control portion 50 outputs a magnetic pole position correction permission signal indicating whether execution of a magnet pole position correction (to be described below) can be performed. The magnetic pole position correction permission signal output from the vehicle control portion 50 is input to the phase corrector 101.

The current command generator 9 includes a first map (Trc1 map) 91 for storing a d-axis current command value Idc and a q-axis current command value Iqc corresponding to a torque command Trc1 output from the vehicle control portion 50, a second map (Trc2 map) 92 for storing a d-axis current command value Idc and a q-axis current command value Iqc corresponding to a torque command Trc2 output from the phase corrector 101, and a switch 103 for changing the d-axis current command value Idc and the q-axis current command value Iqc to be input to the current command switcher 10.

The switch 103 selects one of a current command value corresponding to the torque command Trc1 and a current command value corresponding to the torque command Trc2. According to the d-axis current command value Idc and the q-axis current command value Iqc corresponding to the torque command Trc2, the d-axis component of the armature current to be supplied to the motor 1 is a signal whose waveform is shaped like a micropulse. The q-axis component thereof represents "0". The switch 103 is controlled by a switch control signal output from the phase corrector 101.

Then, to the phase corrector 101, the calculated d-axis voltage value Vdc and the calculated q-axis voltage value Vqc are input from the voltage command generator 15 and the calculated rotational angle speed ω is input from the speed calculator 20. In addition, the magnetic pole position correction permission signal output from the vehicle control portion 50 is input to the phase corrector 101. When the magnetic pole position correction permission signal is input to the phase corrector 101, so that the phase corrector 101 starts performing the process of obtaining the magnetic pole correction angle θofs, the torque command Trc2 is input to the current command generator 9. According to the d-axis current command value Idc and the q-axis current command value Iqc corresponding to the torque command Trc2 generated by the current command generator 9, the d-axis component of the armature current of the motor 1 is a signal whose waveform is shaped like a micropulse the level range of which is centered at 0 (Ampere (A)). The q-axis component thereof represents "0". Subsequently, at the lapse of a predetermined time since the start of the process, the phase corrector 101 outputs to the current command switcher 10 a switch command for causing the current command switcher 10 to output a set (0, 0) of a d-axis current command value Idc of "0" and a q-axis current command value Iqc of "0".

The micropulse current which is the d-axis component based on the torque command Trc2 is an alternating current whose amplitude in a positive direction from a central level of "0" (A) is equal to that in a negative direction therefrom. That is, a value obtained by performing time integral on the micropulse current is substantially "0" (A). The frequency of the micropulse current is extremely higher than the response frequency (response speed) of the PWM inverter circuit 17. Accordingly, the response of the PWM inverter circuit 17 cannot follow change of the micropulse current. Thus, the PWM inverter circuit 17 outputs a voltage to thereby control the d-axis current Id to become "0".

The d-axis component of the armature current based on the torque command Trc2 is not limited to a signal whose waveform is rectangular. A sinusoidal wave, a triangle wave, and a sawtooth wave, the value of the time integral of which is substantially 0 (A), can be employed as the d-axis component.

In the apparatus according to the present embodiment described hereinabove, the current command generator 9, the current command switcher 10, the subtractors 13, 14, and 19, the voltage command generator 15, the current coordinate converter 12, the voltage coordinate converter 16, the phase corrector 101, and the speed calculator 20 are provided as functional means of a microcomputer (including input/output circuits) to which a predetermined program is loaded.

Next, an operation sequence of the apparatus according to the present embodiment is described below with reference to a timing chart illustrated in FIG. 3, FIG. 4 and a flowchart illustrated in FIG. 5, with a focus on the details of the phase corrector 101. When the starter switch (not shown) of the vehicle is turned on, electric power is supplied to the motor controller 100. To cause the motor 1 to operate as a starter motor for the engine 3 thereby to start the engine 3, a torque command value Trc is given to the motor controller 100 from a processor (not shown) as illustrated in a second chart from the top of FIG. 3 (moments t1 to t2 in FIG. 3). At that time, the phase corrector 101 of the motor collector 100 outputs a magnetic pole correction angle θofs currently stored. In addition, the phase corrector 101 gives the current command switcher 10 a switching command for causing the current command generator 9 to output a d-axis current command value Idc and a q-axis current command value Iqc. In this state, the motor controller 100 performs the above processes corresponding to each of the current command generator 9, the subtractors 13, 14, and 19, the voltage command generator 15, the current coordinate converter 12, and the voltage coordinate converter 16. Consequently, the motor controller 100 causes the motor 1 to generate torque (for starting the engine 3) according to the torque command value Trc. Accordingly, the cranking of the engine 3 is started. In addition, an engine controller (not shown) performs an operation of controlling the supply of fuel to the engine 3 and that of controlling the ignition of the engine 3. Thus, the engine 3 is started.

Figure 3:
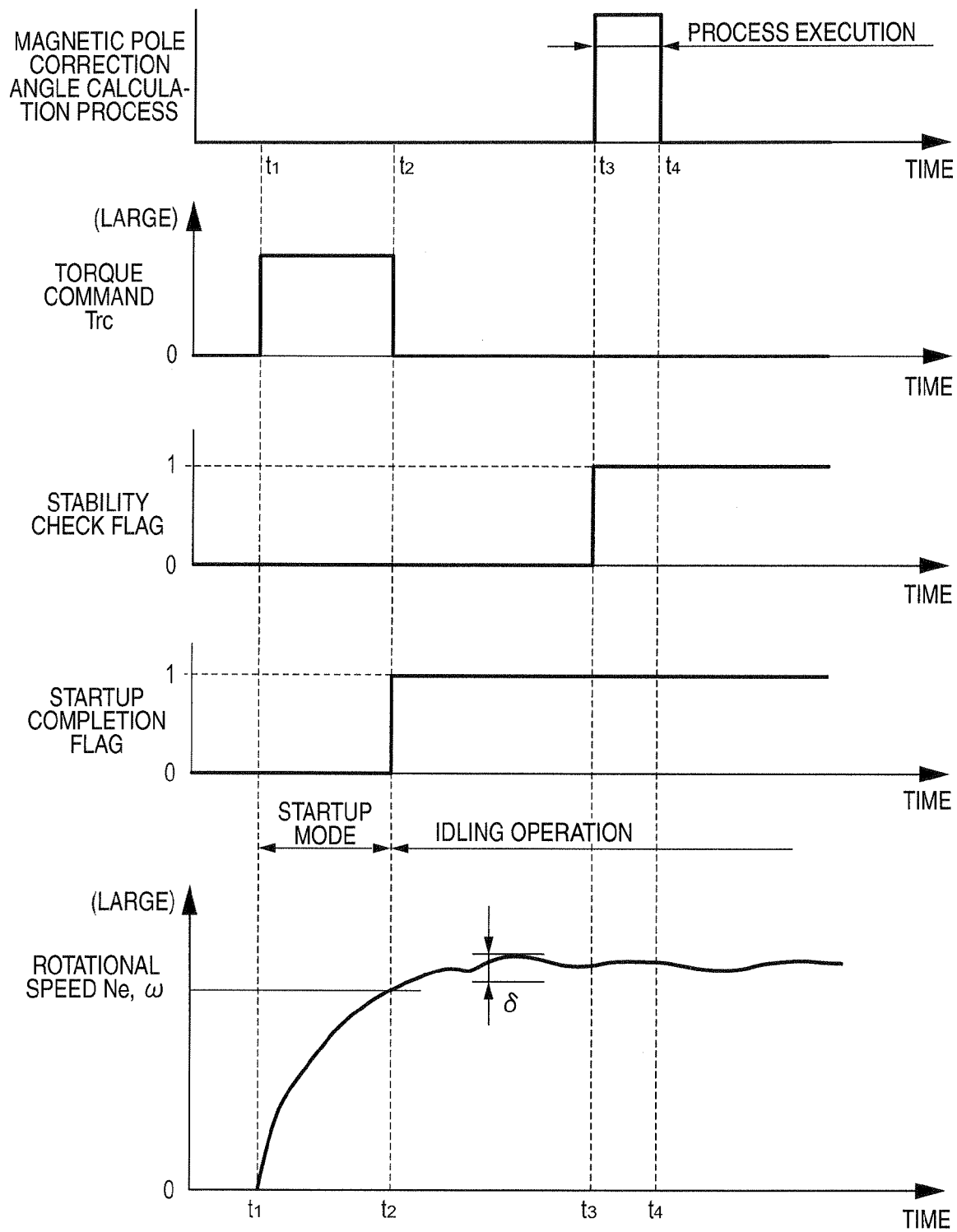
FIG. 3 is a timing chart illustrating an operation of the apparatus according to each of the embodiment of the invention and the reference example.
Figure 4:
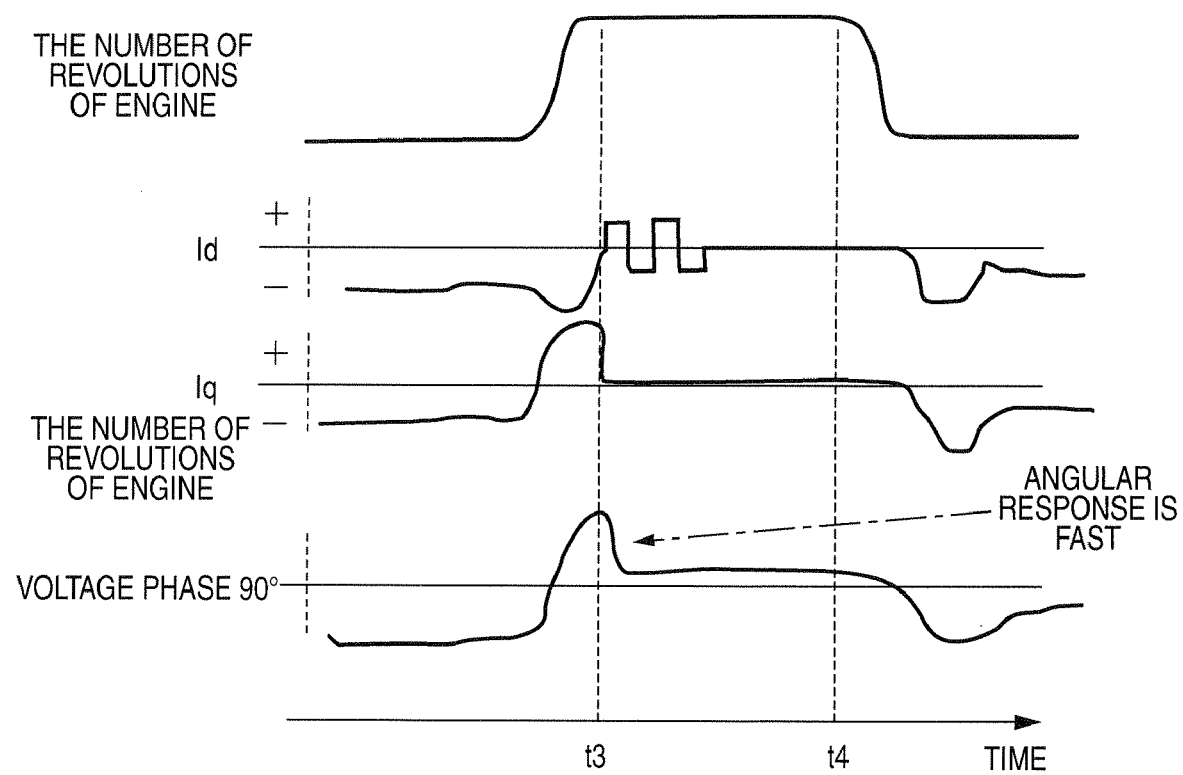
FIG. 4 is a graph illustrating change in each of the number of rotations of an engine 3, a d-axis current, a q-axis current and a voltage phase measured when the motor controller 100 illustrated in FIG. 1 obtains a magnetic pole correction angle $\theta ofs$.

As illustrated in a fifth chart from the top of FIG. 3, the rotational speed Ne of the engine 3 (which is equal to the rotational angular velocity ω of the motor 1 in the present embodiment) is increased by starting the engine 3. When the rotational speed Ne is a predetermined value or higher, the startup mode of the engine 3 is finished (the engine 3 starts idling). The torque command value Trc for the motor 1 becomes "0" at moment t2 illustrated in FIG. 3. It is assumed that at that time, the accelerator of the vehicle is not depressed.

At that time, a startup completion flag indicating whether the startup mode of the engine 3 is completed is set to "1" by the processor (not shown), as illustrated in a fourth chart from the top of FIG. 3. The startup completion flag is input to the phase corrector 101 of the motor controller 100 as data representing an operation mode of the engine 3.

Then, the idling of the engine 3 is continued. As the rotational speed Ne of the engine 3 or the rotational angular velocity ω of the motor 1 is maintained substantially at a constant value close to a predetermined idling rotational speed (e.g., 800 revolutions per minute (rpm) to 1000 rpm), a stability check flag indicating whether the rotational speed of the motor 1 is substantially at a predetermined constant value (e.g., 2000 rpm) or less is set to "1" by the phase corrector 101 (at moment t3 in FIG. 3). At that time, a magnet pole position correction permission signal is input to the phase corrector 101. Thus, the phase corrector 101 performs a process for newly obtaining the magnetic pole correction angle θofs (moments t3 to t4 in FIG. 3).

Hereinafter, the process for newly obtaining the magnetic pole correction angle θofs is described in detail with reference to FIG. 4. FIG. 4 is a graph illustrating change in each of the number of rotations of the engine 3, the d-axis current, the q-axis current and the voltage phase measured when the motor controller 100 illustrated in FIG. 1 obtains a magnetic pole correction angle θofs. The phase corrector 101 inputs a torque command Trc2 to the current command generator 9 when starting the process for newly obtaining the magnetic pole correction angle θofs. When the torque command Trc2 is input to the current command generator 9, the current command generator 9 outputs a d-axis component Idc and a q-axis current command value Iqc such that the d-axis component of the armature current of the motor 1 is a signal whose waveform is shaped like a micropulse the level range of which is centered at 0 (Ampere (A)), and that the q-axis component thereof represents "0".

Subsequently, at the lapse of a predetermined time since the start of inputting of the torque command Trc, the phase corrector 101 outputs to the current command switcher 10 a switch command for causing the current command switcher 10 to output a set (0, 0) of the d-axis current command value Idc and the q-axis current command value Iqc, each of which is a value of "0". The phase corrector 101 newly obtains the magnetic pole correction angle θofs at the lapse of a predetermined time since the outputting of the switch command.

Figure 5:
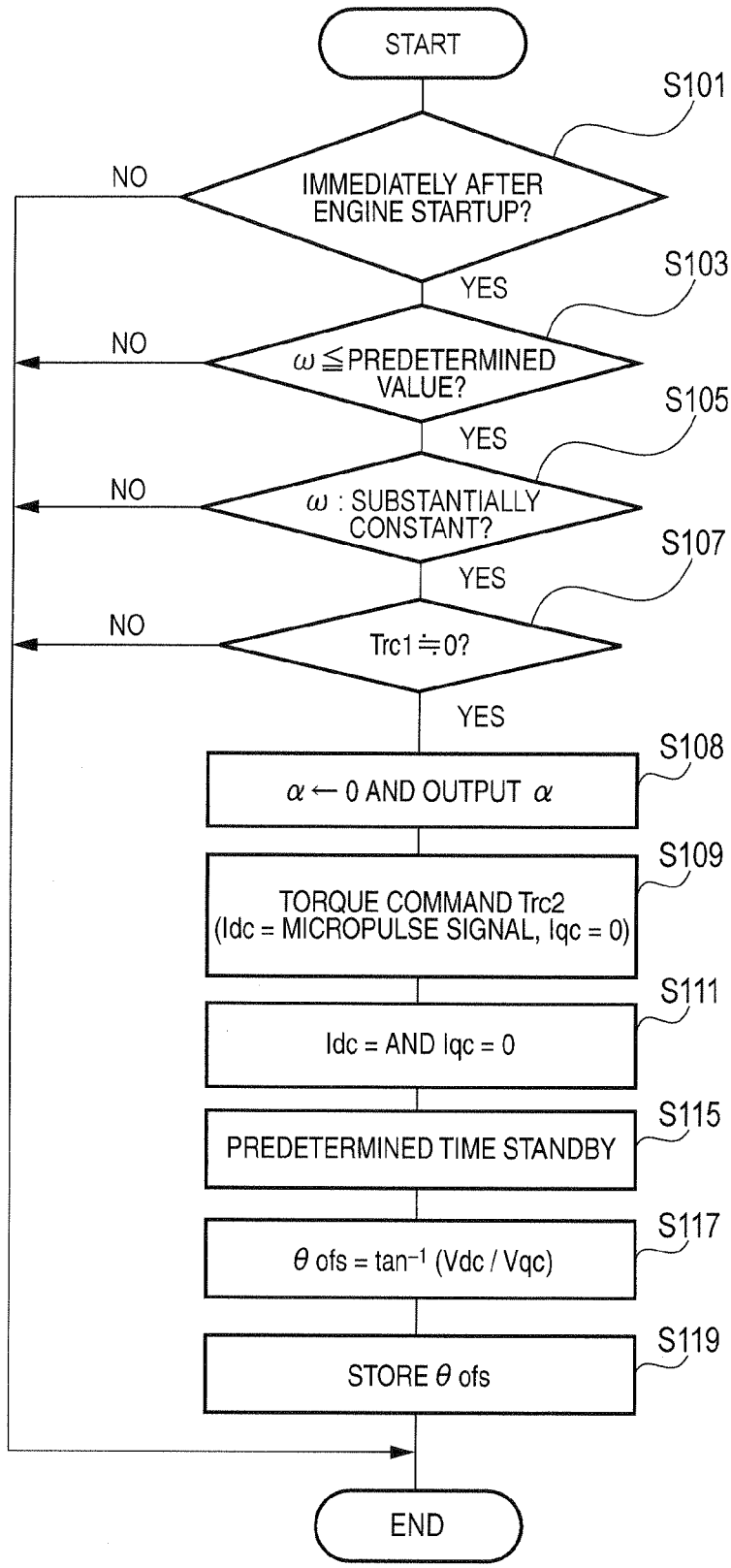
FIG. 5 is a flowchart illustrating an operation of a phase corrector according to a first embodiment of the invention.

The process of the phase corrector 101 according to the above sequence is performed as illustrated in FIG. 5.

In step S101, based on the value of the startup completion flag (see FIG. 3), the phase corrector 101 determines whether the present time is immediately after the completion of the startup mode of the engine 3. If a result of the determination is YES (at moment t2 in FIG. 3), in step S103, the phase corrector 101 determines whether the rotational angular velocity ω of the motor 1 is equal to or lower than a predetermined value (e.g., 2000 rpm). Then, in step S105, the phase corrector 101 determines whether the rotational angular velocity w of the motor 1 is equal to or lower than a substantially constant value. The determination made in step S105 is based on whether temporal change of each of the rotational angular velocity ω of the motor 1 obtained by the speed calculator 20 is within a predetermined range δ (see the fifth chart from the top of FIG. 3) for at least a predetermined time. If results in steps 103 and 105 are YES, in step S107, the phase corrector 101 determines whether the toque command value Trc1 is substantially "0". This determination is based on whether the torque command value Trc is within a predetermined range close to "0".

If a result of the determination is YES in step S107 (i.e., if all the results in steps S101 to S107 are YES), the phase corrector 101 performs a process from step S108 or later and obtains the magnetic pole correction angle θofs as described below. If the result in one of steps S101 to S107 is NO, the process is finished. In this case, the phase corrector 101 outputs the magnetic pole correction angle θofs currently stored therein.

In step S108, the phase corrector 101 sets the temporary set correction angle α to "0" and outputs this angle instead of the magnetic pole correction angle θofs. Next, in step S109, the phase corrector 101 inputs the torque command Trc2 to the current command generator 9. When the torque command Trc2 is input to the current command generator 9, the current command generator 9 outputs a d-axis current command Idc and a q-axis current command value Iqc for a predetermined time such that the d-axis component of the armature current of the motor 1 is a signal whose waveform is shaped like a micropulse the level range of which is centered at 0 (A), and that the q-axis component represents "0". The predetermined time is a necessary and sufficient time taken since the execution of the processing in step S109 until the voltage phase tan$^{-1}$ (Vdc/Vqc) illustrated in FIG. 4 converges. Thus, the phase corrector 101 does not proceed to the next step S111 until variation of the voltage phase becomes within a predetermined value. Next, in step S111, the phase corrector 101 gives the current command switcher 10 a switch command for causing the current command switcher 10 to output the d-axis current command value Idc=0 and the q-axis current command value Iqc=0.

In this case, the magnetic pole rotation angle θ is obtained by the subtractor 19 as follows: θ=θact−α=θact. Thus, the detected magnetic pole angle θact obtained by the magnetic pole position detector 8 is inputted without change to the current coordinate converter 12 and the voltage coordinate converter 16 as the magnetic pole rotational angle θ which is used in the coordinate conversion performed by the current coordinate converter 12 and the voltage coordinate converter 16. In this state, the motor controller 100 obtains phase voltage command values Vuc, Vvc, and Vwc so that each of the detected d-axis current Id and the detected q-axis current Iq is equal to a command value of "0". Then, the motor controller 100 manipulates the voltages to be applied to the armature of the motor 1. Consequently, actual armature currents, i.e., currents flowing through the U-phase, the V-phase, and the W-phase of the armature of the motor 1 respectively are controlled to be set substantially at "0".

After the execution of processing in step S111, the phase corrector 101 waits for a predetermined time in step S115. Then, the phase corrector 101 performs the following processing in step S117 which is described below. The predetermined time in step S117 is a necessary and sufficient time taken since the execution of the processing in step S111 until the actual armature currents of the motor 1 converge nearly to "0". The predetermined time is, e.g., 0.5 seconds, for example. Alternatively, instead of causing the phase corrector 101 to wait for the predetermined time in step S115, the phase corrector 101 can be modified to monitor armature currents detected by the armature current detectors 11u and 11v, and to perform processing in step S117 when the monitored armature currents are within in a predetermined range close to "0".

After the execution of the processing in step S115, the state of the motor 1 is changed to the zero-current state. At that time, the rotation angle of the magnetic poles recognized in the dq vector control process of the motor controller 100, i.e., the angular position of the command axis dc illustrated in FIG. 10B, i.e., the magnetic pole rotation angle θ, is the detected rotation angle θact obtained by the magnetic pole position detector 8. Thus, an error angle of the detected rotation angle θact with respect to the actual rotation angle of the magnetic poles is given by the above equation (1). Thus, in step S117, the phase corrector 101 calculates the right side of the equation (1) using the d-axis voltage command value Vdc and the q-axis voltage command value Vqc which are obtained by the voltage command generator 15. Then, the phase corrector 101 obtains the value determined by calculating the right side of the equation (1) as a new magnetic pole correction angle θofs. Then, the phase corrector 101 stores the newly obtained magnetic pole correction angle θofs in step S119. Then, the process of obtaining the magnetic pole correction angle θofs is ended.

Subsequently, the phase corrector 101 outputs the magnetic pole correction angle θofs stored in step S119 until the phase corrector 101 performs the process (see steps S108 to S119) of determining the magnetic pole correction angle θofs again, i.e., until the engine 3 resumes the next operation (during an operation of the vehicle). Thus, subsequently, the magnetic pole rotation angle θ obtained by subtracting the magnetic pole correction angle θofs from the detected rotation angle θact is used as information representing the actual magnetic pole position of the rotor 4 in an operation of controlling the motor 1 by the motor controller 100.

The magnetic pole correction angle θofs obtained in step S117 represents an error angle of the detected rotational angle θact with respect to the actual rotation angle of the magnetic pole position according to the principles described by referring to FIG. 10. In this case, according to the present embodiment, when the rotational speed ω of the motor 1 is equal to or lower than a predetermined value, i.e., when it is unnecessary to perform a field weakening control process of intentionally setting the d-axis current command value Idc to a negative value, the process of determining the magnetic pole correction angle θofs is performed. In addition, when the rotational speed ω of the motor 1 is substantially constant, i.e., when the counter-electromotive forces generated in the phases of the armature 7 are substantially constant, the magnetic pole correction angle θofs is obtained. Thus, the magnetic pole correction angle θofs can accurately be obtained. This is the same not only with a case where the permanent magnet 5 of the rotor 4 is of the cylindrical type but with a case where the permanent magnet 5 is of the salient-pole type.

As described above, according to the present embodiment, when the magnetic pole correction angle θofs is obtained, the d-axis current that is a signal whose waveform is shaped like a micropulse the level range of which is centered at 0 (Ampere (A)) is supplied to the motor 1 before the armature current is brought into the zero-current state. At that time, a dead time correction is performed using the d-axis current that is a signal having a waveform shaped like a micropulse. Thus, the voltage phase is relatively quickly stabilized. Accordingly, a wait time, in which the phase corrector waits when the magnetic pole correction angle θofs is obtained, can be shortened. Consequently, the magnetic pole correction angle θofs can be obtained in a short time.

In the present embodiment, the magnetic pole correction angle θofs is obtained according to the equation (1) in step S117 illustrated in FIG. 5. However, the magnetic pole correction angle θofs can be obtained according to the equation (2) or (3). In the present embodiment, the temporary set correction angle α is set at "0", which is used while the process of obtaining the magnetic pole correction angle θofs is performed. However, another value, e.g., the present value of the magnetic pole correction angle θofs can be used as the temporary set correction angle α. In this case, it is useful to add a value obtained by calculating the right side of the equation (1) or (2) or (3) to the present value of the magnetic pole correction angle θofs to thereby obtain a new magnetic pole correction angle θofs in step S117 illustrated in FIG. 5.

Next, a reference example relating to the invention is described below with reference to FIG. 6. The reference example differs from the first embodiment only in the process of obtaining the magnetic pole correction angle θofs using the phase corrector 101 (i.e., the process corresponding to FIG. 5). The components and process parts of the reference example which are the same as those of the first embodiment are indicated by the same reference characters and drawings. Thus, the description of such components and process parts is omitted.

Figure 6:
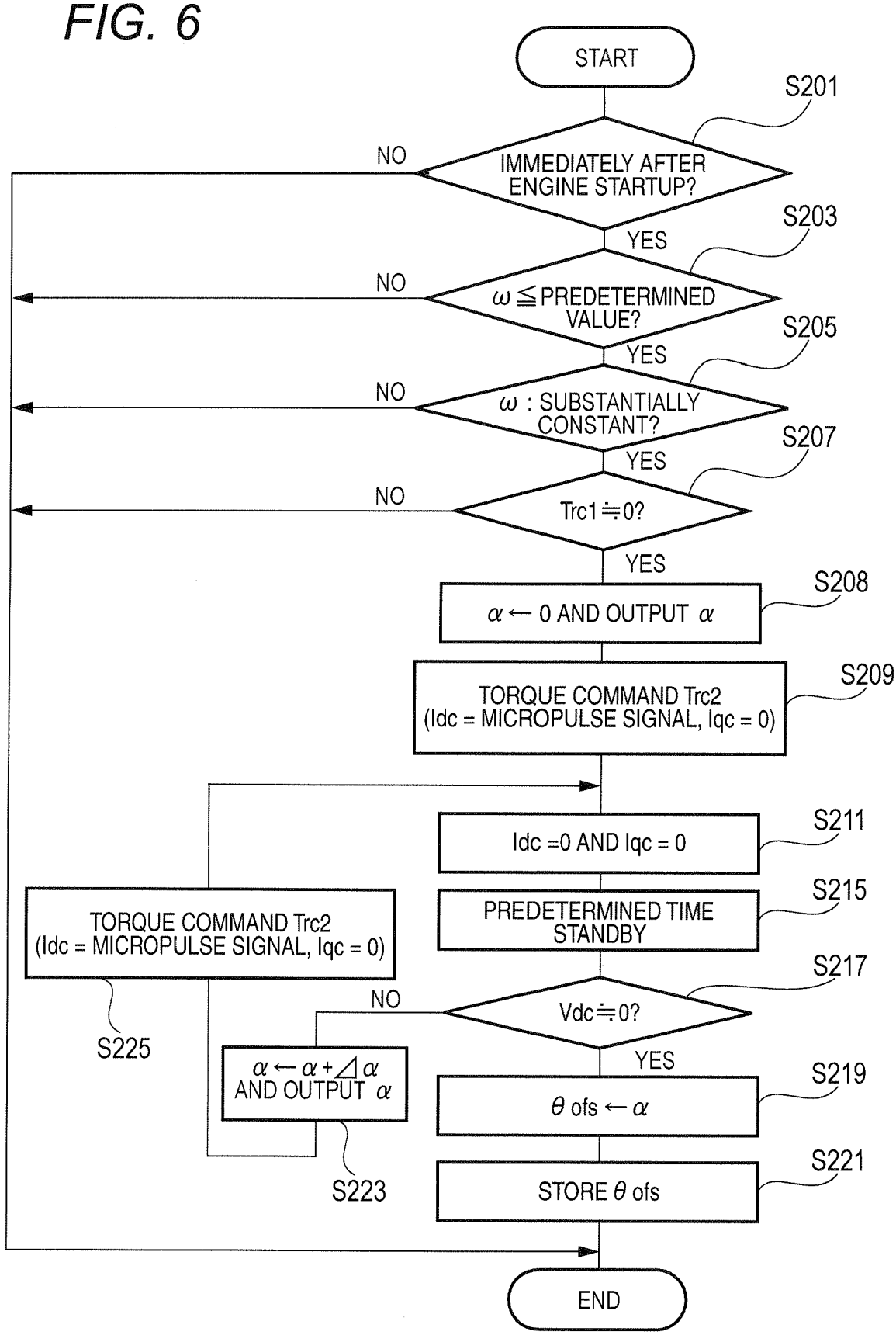
FIG. 6 is a flowchart illustrating an operation of a phase corrector according to the reference example associated with the invention.

According to the present reference example, the process performed by the phase corrector 101 to obtain the magnetic pole correction angle θofs is illustrated in a flowchart shown in FIG. 6. With reference to FIG. 6, a determination process performed in steps S201 to S207 (i.e., that of determining whether conditions for obtaining the magnetic pole correction angle θofs are satisfied) is the same as that performed in steps S101 to S107 illustrated in FIG. 5. If the conditions in steps S201 to S207 are satisfied, the phase corrector 101 performs the processing in steps S208 to S225 to thereby obtain the magnetic pole correction angle θofs. In the process of obtaining the magnetic pole correction angle θofs according to the present embodiment, the temporary set correction angle α is set to a plurality of values. Then, the magnetic pole correction angle θofs is obtained by performing a search process. More particularly, in step S211, the phase corrector 101 gives the current command switcher 10 a switch command for causing the current command switcher 10 to output the d-axis current command value Idc (="0") and the q-axis current command value Iqc (="0"). In step S208, the phase corrector 101 sets the temporary set correction angle α to an initial value of, e.g., "0" and outputs the temporary set correction angle α, instead of the magnetic pole correction angle θofs. Then, the phase corrector 101 waits for a predetermined time in step S215. The predetermined time in step S215 is a necessary and sufficient time taken until the actual armature currents of the motor 1 converge nearly to "0", similarly to the case of step S115 illustrated in FIG. 5. The predetermined time is, e.g., 0.5 seconds. Alternatively, instead of waiting for the predetermined time in step S215, the phase corrector 101 can be modified to monitor armature currents detected by the armature current detectors 11u, and 11v, and to perform processing in the next step S217 when the monitored armature currents are within a predetermined range close to "0".

Next, in step S217, the phase corrector 101 determines whether the d-axis voltage command value Vdc obtained by the voltage command generator 15 is substantially "0". This determination is made by determining whether the d-axis voltage command value Vdc is within a predetermined range close to "0". If a result of the determination is YES in step S217, the magnetic pole rotation angle θ obtained by subtracting the temporary set correction angle α currently output from the phase corrector 101 from the detected rotational angle θact is substantially equal to the actual rotational angle of the magnetic poles of the rotor 4 (i.e., the rotor 4 is currently in the state illustrated in FIG. 10A).

Thus, the phase corrector 101 obtains the temporary set correction angle α currently output as the magnetic pole correcting angle θofs in step S219. In step S221, the phase corrector 101 stores the obtained magnetic pole correction angle θofs. Then, the process of obtaining the magnetic pole correcting angle θofs as illustrated in FIG. 6 is ended.

On the other hand, if a result of determination in step S217 is NO, the magnetic pole rotational angle θ obtained by subtracting the temporary set correction angle α currently output from the phase corrector 101 from the detected rotational angle θact is not equal to the actual rotational angle of the magnetic poles of the rotor 4 (i.e., the rotor 4 is currently in the state illustrated in FIG. 10B). Then, the phase corrector 101 updates the temporary sett correction angle α into a value that is greater than the present value thereof by a small predetermined value Δα in step S223. After the torque command Trc2 is input to the current command generator 9 in step S225, the phase corrector 101 repeats the processing from step S211.

Thus, the value of the temporary set correction angle α is changed by a predetermined amount Δα each time until the d-axis voltage command value Vdc is reduced substantially to "0". Thus, the value of the temporary set correction angle corresponding to the d-axis voltage command value Vdc reduced to substantially "0" is searched for. The value of the temporary set correction angle α searched for is finally obtained and stored as the magnetic pole correction angle θofs.

The magnetic pole correction angle θofs obtained in step S219 in the aforementioned way represents an error angle of the detected rotational angle θact, which corresponds to the actual rotational angle of the magnetic poles, according to the principles described by referring to FIGS. 10A and 10B. In this case, similarly to the first embodiment, the magnetic pole correction angle θofs is obtained in a state in which the rotational speed ω of the motor 1 is equal to or lower than a predetermined value and substantially constant. Consequently, the magnetic pole correction angle θofs can accurately be obtained. This is the same not only with the case where the permanent magnet 5 of the rotor 4 is of the cylindrical type, but also with the case where the permanent magnet 5 is of the salient pole type.

As described above, according to the present reference example, similarly to the first embodiment, when the magnetic pole correction angle θofs is obtained, the d-axis current that is a signal whose waveform is shaped like a micropulse is supplied to the motor 1 before the armature current is brought into the zero-current state. At that time, a dead time correction is performed using the d-axis current that is a signal having a waveform shaped like a micropulse. Thus, the voltage phase is relatively quickly stabilized. Accordingly, a wait time, in which the phase corrector waits when the magnetic pole correction angle θofs is obtained, can be shortened. Consequently, the magnetic pole correction angle θofs can be obtained in a short time.

In the present reference example, the initial value of the temporary set correction angle α is set to "0". However, the present value of the magnetic pole correction angle θofs can be used as the initial value of the temporary set correction angle α, and the temporary set correction angle α can be changed in a range close to the initial value.

Second Embodiment

Figure 7:
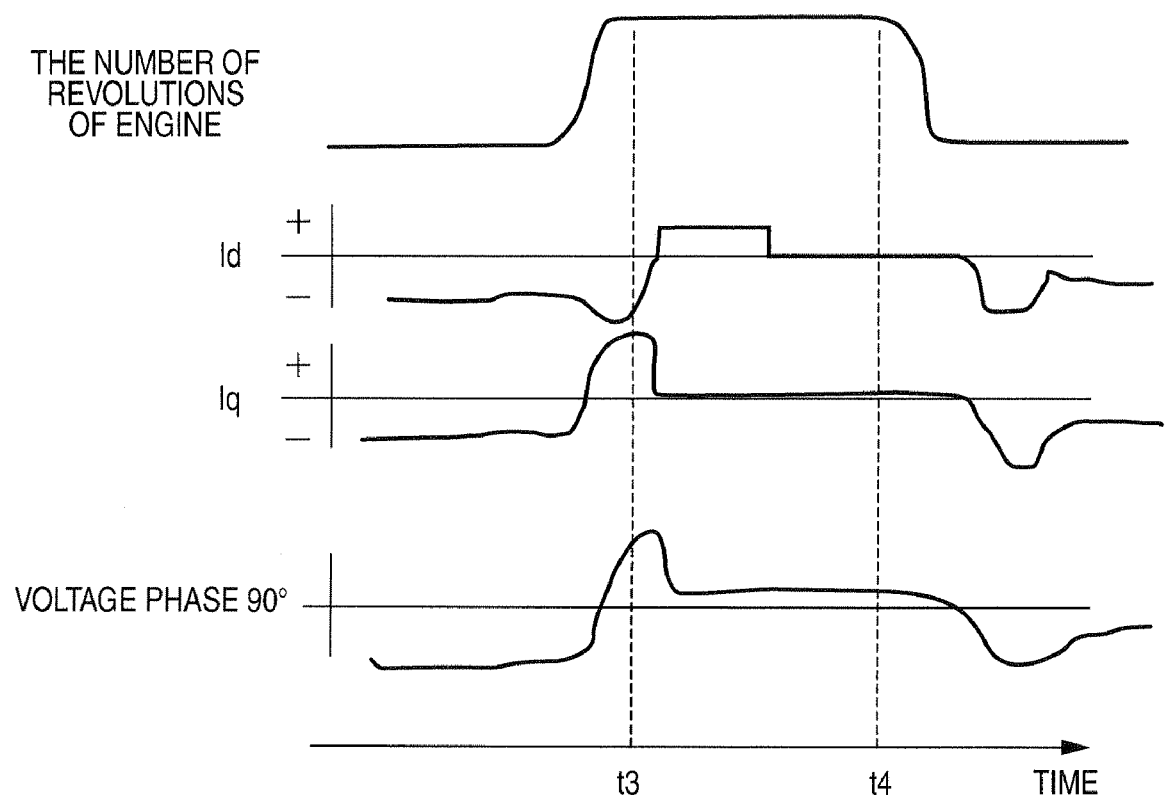
FIG. 7 is a graph illustrating change in each of the number of rotations of an engine 3, a d-axis current, a q-axis current and a voltage phase measured when a motor controller according to a second embodiment obtains a magnetic pole correction angle $\theta ofs$.

In the first embodiment and the reference example, the rate of stabilization of the voltage phase is increased by supplying the d-axis current, which is a signal whose waveform is shaped like a micropulse, to the motor 1 before the armature current is put into a zero-current state (including a substantially-zero-current state). According to a second embodiment, after the position of each magnetic pole position of the rotor 4 is set at a maximum error position in one of positive and negative directions, as illustrated in FIG. 7, the phase corrector 101 supplies to the motor 1 a d-axis current that is a rectangular wave whose level is constant in a direction in which an error is corrected, for a predetermined time. The setting of the rotor 4 is performed using an actuator (not shown) or the like. Subsequently, similarly to the first embodiment and the reference example, the phase corrector 101 performs a control operation of bringing armature current into a zero-current state. Thus, the magnetic pole correction angle θofs is obtained and stored.

According to the present embodiment, the d-axis current which is a rectangular wave is supplied to the motor 1 after each of the magnetic pole positions of the rotor 4 is set at one of maximum error positions. Thus, when the magnetic poles of the rotor 4 are set at the maximum error position, it is sufficient to supply a necessary minimum number of positive or negative pulses thereto. Thus, the correction angle can be obtained at higher speed without supplying an alternating current thereto.

In a case where the control response gain of the voltage command generator 15 provided in the motor controller according to the first embodiment, the reference example and the second embodiment, the response speed of the PWM inverter circuit 17 can be changed. When such a voltage command generator 15 is used, the response speed can be increased by temporarily increasing the control response gain while the magnetic pole correction angle θofs is obtained. When the response speed is increased, the response time of the voltage phase is shortened. Consequently, a time required until the voltage phase of the PWM inverter circuit 17 with respect to current command values (Idc=0 and Iqc=0) for putting the armature current into a zero-current state converges. Thus, when the magnetic pole correction angle θofs is measured, a high response speed can be implemented without preliminarily supplying to the motor 1 the d-axis current which is a signal, whose waveform is shaped like a micropulse, by temporarily increasing the control response gain of the voltage command generator 15.

In the first embodiment, the reference example, and the second embodiment as described above, the magnetic pole correction angle θofs is obtained when the torque command value (required torque) Trc of the motor 1 is almost "0" during the idling just after the startup of the engine 3. However, the apparatus can be modified such that the magnetic pole correction angle θofs is obtained while idling is performed during the temporary stop of a vehicle. Alternatively, in a situation where it is unnecessary to generate torque in the motor 1, the magnetic pole correction angle θofs can be obtained during cruising of a vehicle. In this case, it is useful to omit the determination process in step S1 illustrated in FIG. 5 in the embodiment.

According to the present invention, basically, the magnetic pole correction angle θofs can be obtained in a situation where the motor 1 is not required to generate torque. Thus, the magnetic pole correction angle θofs can be determined during the idling of a vehicle without generation of torque by the motor 1, i.e., while the vehicle runs by inertia without giving a drive force to drive wheels while an operated amount of the accelerator is set to "0" during running. It is useful to modify an embodiment in this such that, instead of the determination processing in step S1 illustrated in FIG. 5, it is determined whether an operation of depressing the accelerator is turned off (i.e., whether an operated amount of the accelerator is "0"), and that if a result of the determination is YES, the controller can proceed to the next step.

Preferably, the magnetic pole correction angle θofs is obtained during the idling of the engine 3 during which the rotational speed of each of the engine 3 and the rotary electric machine 1 is stabilized. That is, when the rotational speed of the rotor 4 is substantially constant, the counter-electromotive voltage E of the armature is substantially constant. Thus, the d-axis voltage command value Vdc and the q-axis voltage command value Vqc in the zero-current state are substantially constant. Accordingly, the equations (1) to (3) can accurately hold. Consequently, highly reliable (accurate) magnetic pole correction angle θofs can be obtained.

Desirably, the process of obtaining the magnetic pole correction angle θofs is performed when the rotational speed of the rotor 4 is equal to or lower than a predetermined velocity (e.g., 2000 rpm). That is, in a high-speed rotation region of the motor 1, the counter-electromotive voltage E of the armature 4 is high. Thus, in order to set the armature current I to substantially zero, it is necessary to intentionally set the d-axis current at a negative value and to perform an operation of controlling the motor 1 (what is called a field weakening control operation) so that the magnetic fields of the magnetic poles are weakened. In this state, the equations (1) to (3) do not hold. Accordingly, when the rotational speed of the rotor 4 is equal to or lower than a predetermined speed, a process of obtaining the magnetic pole correction angle θofs is performed. Consequently, the reliability of the magnetic pole correction angle θofs to be obtained by the process can be assured.

In the first embodiment, the reference example, and the second embodiment, basically, the magnetic pole correction angle θofs can be obtained each time the engine 3 is started. However, the magnetic pole correction angle θofs can be obtained and updated when the production of the vehicle is completed in a production factory or when the maintenance of the vehicle is performed. In this case, e.g., it is useful to preliminarily provide an operation switch, which is operated by, e.g., a production worker or a maintenance worker in a production factory to instruct whether the worker permits the phase corrector 101 of the motor controller 100 to calculate the magnetic pole correction angle θofs, by being connected to the motor controller 100. In addition, a process of determining, before a determination process in step S1 illustrated in FIG. 5 is performed, whether the operation switch is turned on/off. Then, the phase corrector 101 executes the process from step S1 illustrated in FIG. 5 only when the operation switch is turned on by the worker.

In the description of the first embodiment, the reference example, and the second embodiment, the control of the motor 1 mounted on a parallel type hybrid vehicle has been described. However, the invention can be applied to a permanent-magnet rotary electric machine that is mounted as a running prime mover on a series type hybrid vehicle. In addition, the invention is applicable to a permanent-magnet rotary electric machine (a permanent-magnet motor or a permanent-magnet generator), which is used as a prime mover for apparatuses other than vehicles.

In the first embodiment, the reference example, and the second embodiment, the controller includes the current command switcher 10. After it is determined whether the torque command represents substantially "0" in step S107, the controller proceeds to step S109. However, in a case where it can be clearly confirmed that the torque command represents "0", e.g., in a case where the invention is applied to a permanent-magnet generator mounted in as an engine type generator (a generator having an engine as a drive source), the current command switcher 10 can be omitted.

In the description of the first embodiment, the reference example, and the second embodiment, the apparatus has been exemplified, in which the motor 1 is controlled by performing the dq vector control process. However, the magnetic pole correction angle θofs can be obtained while the motor 1 is controlled in actual operation by performing a control method other than the dq vector control process. In this case, when the magnetic pole correction angle θofs is obtained, a controller for performing the control process other than the dq vector control process inputs phase voltage command values Vu, Vv, and Vw to the PWM inverter circuit 17 and performs a control operation of setting the armature currents of the motor 1 to "0", and obtains the d-axis voltage command value Vdc and the q-axis voltage command value Vqc by performing the same dq vector control process as that performed by the motor controller 100 according to the first embodiment, the reference example, and the second embodiment (however, the command values Vdc and Vqc are not used to actually control the motor 1). Then, the magnetic pole correction angle θofs is obtained, similarly to the first embodiment, the reference example, and the second embodiment.

What is claimed is:

1. An apparatus for controlling a permanent magnet rotary electric machine comprising:
   a magnetic pole position detection portion configured to detect positions of magnetic poles of a rotor of the permanent magnet rotary electric machine having a permanent magnet and an armature in the rotor and a stator, respectively,
   a correction quantity determination portion configured to obtain a magnet pole position correction quantity for correcting positions of magnet poles to be detected by the magnetic pole position detection portion, and
   a current control portion configured to control an armature current flowing through the armature while manipulating a phase of the armature voltage to be applied to the armature according to the magnetic pole positions obtained by correcting the magnetic pole positions detected by the magnetic pole position detection portion using the magnetic pole position correction quantity obtained by the correction quantity determination portion, wherein after the current control portion is controlled in a state that the rotor rotates at a constant speed, to supply a predetermined current to the armature,
   a dq vector control process is performed by determining a predetermined temporarily set value as the magnetic pole position correction quantity while a d-axis current command value and a q-axis current command value in the dq vector control process performed on a dq coordinate system that has a d-axis extending in a magnetic field direction of the permanent magnet of the rotor and a q-axis extending in a direction perpendicular to the d-axis, and
   the magnetic pole position correction quantity is obtained based on a predetermined operation expression using the d-axis voltage command value and the q-axis voltage command value as variable numbers which are obtained when the dq vector control process is performed.

2. The apparatus for controlling a permanent magnet rotary electric machine according to claim 1, wherein
   the predetermined current is an alternating current whose direction is reversed between positive and negative directions.

3. The apparatus for controlling a permanent magnet rotary electric machine according to claim 2, wherein
   the predetermined current is an alternating current of which a value of the time integral is substantially zero.

4. The apparatus for controlling a permanent magnet rotary electric machine according to claim 1, wherein
   the correction quantity determination portion controls the current control portion to supply the predetermined current to the armature until a variation in the value of the arctangent of a ratio of the d-axis voltage command value to the q-axis voltage command value is within a predetermined value.

5. The apparatus for controlling a permanent magnet rotary electric machine according to claim 1, wherein
   before the correction quantity determination portion supplies the predetermined current to the armature, each of the positions of the magnetic poles of the rotor is set at a maximum error position in one of the positive and negative directions, and
   the predetermined current is a rectangular wave having a constant amplitude.

6. The apparatus for controlling a permanent magnet rotary electric machine according to claim 1, wherein
   while obtaining the magnetic pole position correction quantity, the correction quantity determination portion increases a response gain upon obtaining the d-axis voltage command value and the q-axis voltage command value during performance of the dq vector control process.

* * * * *